United States Patent
Fell et al.

(10) Patent No.: US 8,676,979 B2
(45) Date of Patent: Mar. 18, 2014

(54) METHODS AND SYSTEMS FOR EFFICIENT API INTEGRATED LOGIN IN A MULTI-TENANT DATABASE ENVIRONMENT

(75) Inventors: Simon Z Fell, Corte Madera, CA (US); Vinod Mehra, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 387 days.

(21) Appl. No.: 13/027,992

(22) Filed: Feb. 15, 2011

(65) Prior Publication Data

US 2011/0289508 A1    Nov. 24, 2011

Related U.S. Application Data

(60) Provisional application No. 61/345,983, filed on May 18, 2010.

(51) Int. Cl.
　　*G06F 15/16*　　(2006.01)
　　*G06F 15/173*　(2006.01)
　　*G06F 9/46*　　(2006.01)

(52) U.S. Cl.
　　USPC ........... 709/226; 709/201; 709/203; 709/208; 709/209; 709/217; 709/218; 709/219; 709/229; 718/105

(58) Field of Classification Search
　　USPC .......... 718/105; 709/201, 203, 208, 209, 217, 709/218, 219, 225, 226, 227, 228, 229, 249, 709/250
　　See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

*Primary Examiner* — Andrew Chriss
*Assistant Examiner* — Jose Perez
(74) *Attorney, Agent, or Firm* — Blakely, Sokoloff, Taylor & Zafman (57) ABSTRACT

Methods and systems for efficient API integrated login in a multi-tenant database environment and for decreasing latency delays during an API login request authentication including receiving a plurality of API login requests at a load balancer of a datacenter, where each of the plurality of API login requests specify a user identifier (userID) and/or an organizational identifier (orgID), fanning the plurality of API login requests across a plurality of redundant instances executing within the datacenter, assigning each API login request to one of the plurality of redundant instances for authentication, and for each of the respective plurality of API login requests, performing a recursive query algorithm at the assigned redundant instance, at one or more recursive redundant instances within the datacenter, and at a remote recursive redundant instance executing in a second datacenter, as necessary, until the login request is authenticated or determined to be invalid.

22 Claims, 6 Drawing Sheets

(56) References Cited

U.S. PATENT DOCUMENTS

| | | |
|---|---|---|
| 6,249,801 B1 * | 6/2001 | Zisapel et al. .............. 718/105 |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,785,713 B1 * | 8/2004 | Freeman et al. .............. 709/208 |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0074453 A1 * | 4/2003 | Ikonen .............. 709/228 |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0212926 A1 * | 11/2003 | Bhat et al. .............. 714/43 |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0078633 A1 * | 4/2004 | Holland .............. 714/5 |
| 2004/0128001 A1 | 7/2004 | Levin et al. |
| 2004/0177156 A1 * | 9/2004 | Hahn et al. .............. 709/240 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0258281 A1 * | 12/2004 | Delgrosso et al. .............. 382/115 |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0059478 A1 * | 3/2006 | Krajewski et al. .............. 717/168 |
| 2007/0078950 A1 * | 4/2007 | Hopkins et al. .............. 709/217 |
| 2007/0101001 A1 * | 5/2007 | Cromer et al. .............. 709/226 |
| 2008/0189274 A1 * | 8/2008 | Mann .............. 707/5 |

* cited by examiner

METHODS AND SYSTEMS FOR EFFICIENT API INTEGRATED LOGIN IN A MULTI-TENANT DATABASE ENVIRONMENT

CLAIM OF PRIORITY

This application is related to, and claims priority to, the provisional utility application entitled "METHODS AND SYSTEMS FOR GENERATING A DYNAMIC WORKFLOW IN A MULTI-TENANT DATABASE ENVIRONMENT," filed on May 18, 2010, having an application No. 61/345,983, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to methods and systems for efficient API integrated login in a multi-tenant database environment and for decreasing latency delays during an API login request authentication.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

An Enterprise Service Provider may use an Application Programming Interface (API) as an authentication mechanism to handle login requests (e.g., requests received by a datacenter or computing center operated or controlled by a particular business Enterprise). However, previously known API login models fail to provide adequate scalability and responsiveness as the size and complexity of a datacenter increases.

For example, incoming authentication requests received at a web domain, such as a "www" or "world wide web" domain must be processed and authenticated by systems within the receiving organization. When the number of incoming requests are small and the infrastructure of the receiving organization is simple (e.g., processing the incoming requests as they arrive), this technique and other previously known models is straight forward, but does not scale well. As the number of incoming requests to be processed or authenticated increases, the system processing the incoming requests can become overwhelmed, and can become a single point of failure. Additionally, as the complexity of the receiving organization increases, the computational load placed upon the authenticating system also increases, eventually making it difficult, if not impossible, for the authenticating system to keep up with demand. As the authenticating system becomes overwhelmed, latency increases as does the risk of an improperly denied authentication request.

One such complexity placed upon the authentication system is handling incoming login requests which do not strictly conform to an HTML based model and therefore require special handling. API login requests, for example, require specialized handling due to the nature of the interface for the request, which is further complicated by Enterprise Service Provider's data center infrastructure which is scaled to handle larger volumes of requests and transactions.

The present state of the art may benefit from the methods and systems for efficient API integrated login in a multi-tenant database environment and for decreasing latency delays during a login request authentication as described herein.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Described herein are systems, devices, and methods for efficient API integrated login in a multi-tenant database environment and for decreasing latency delays during an API login request authentication. For instance, the systems, devices, and methods include the appropriate mechanisms to receive a plurality of API login requests at a load balancer of a datacenter, where each of the plurality of API login requests specify a user identifier (userID) and/or an organizational identifier (orgID). In this instance, the load balancer fans (e.g., via a fanning distribution algorithm) the plurality of API login requests across a plurality of redundant instances executing within the datacenter, assigning each API login request to one of the plurality of redundant instances for authentication. For each of the respective plurality of API login requests, a lookup request is performed on the userID and/or the OrgID specified by the respective API login request via the assigned redundant instance, the lookup request is proxied to one or more recursive redundant instances when the lookup request fails at the assigned redundant instance, and the lookup request is proxied to a remote recursive redundant instance executing in a second datacenter, when the lookup request fails at the one or more recursive redundant instances within the first datacenter.

For example, if an API login request is processed by a redundant instance that cannot locate the userID and/or the OrgID via the datastore resources available to it, the redundant instance may then manage a recursive query algorithm amongst other redundant instances within the datacenter that are associated with different datastore resources within the datacenter which have not yet been queried. Should the other datastores within the datacenter similarly be unable to locate the userID and/or the OrgID specified by the API login request, the recursive query algorithm may be extended to one or more other datacenters, such as datacenters that are located in a geographically distinct region (e.g., a USA based datacenter exhausts its datastore resources and then an Asia region datacenter is referenced, etc.).

In one embodiment, the redundant instance within a first datacenter manages and directs a recursive query algorithm in parallel among other redundant instances within the first datacenter when necessary, but hands off responsibility for managing parallel search within a second datacenter to a redundant instance local to the second datacenter so as to minimize cross datacenter boundary transactions. In such a way, cross datacenter boundary references and transactions may be minimized which may in turn improve the efficiency and decrease latency delays during an API login request authentication, such as authenticating an API login request.

The systems, devices, and methods described herein improve API login request and API login authentication mechanisms, especially where a submission of invalid user identifiers (userIds) and/or organization identifiers (OrgIDs) or the submission of userIds and/or OrgIDs not fully synchronized throughout the host organization cause conventional login request mechanisms to make multiple round trips across datacenter boundaries, where each trip represents a communication with a remote computing device or computing center and has an associated latency (e.g., greater than 300 ms latency). Such round-trips may increase the overall response times for the login request, during which, client connections associated with the login request can potentially time out, thus frustrating the end-user or business partner responsible for triggering the login request. Moreover, conventional login requests mechanisms yield inconsistent results and may appear to an end-user as seemingly working or failing, depending on how a particular login request happens to be routed within the host organization. Practicing the systems and methods described herein may reduce overall latency by, for example, reducing the number of cross-datacenter boundary transactions (e.g., round trips between datacenters).

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within a multi-tenant database environment to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

Figure 1:
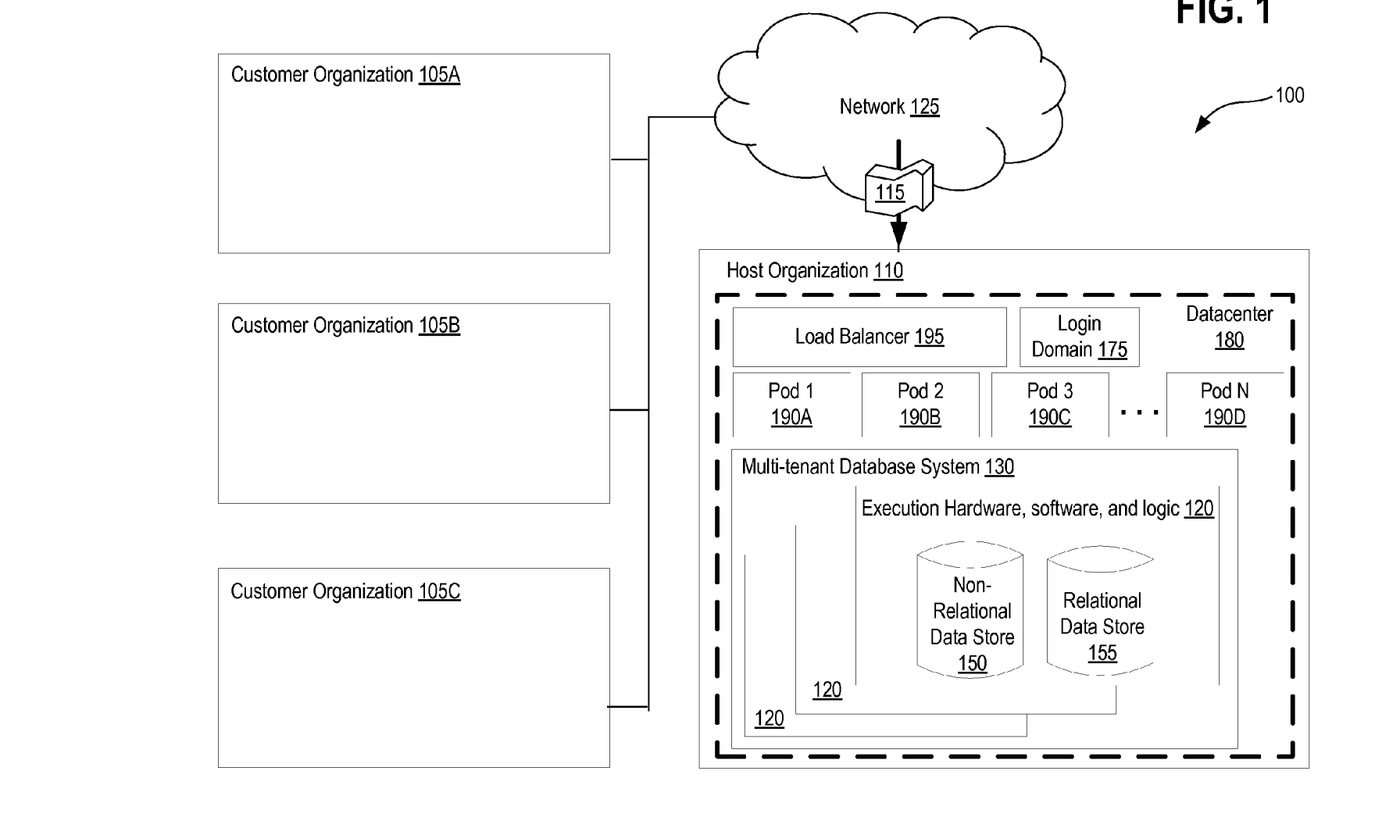
FIG. 1 illustrates an exemplary architecture in which embodiments may operate.

FIG. 1 illustrates an exemplary architecture 100 in which embodiments may operate. Architecture 100 depicts a host organization 110 communicably interfaced with several customer organizations (105A, 105B, and 105C) via network 125. Within the host organization 110 is a Datacenter 180 having a load balancer 195, a login domain 175, multiple pods 190A, 190B, 190C, and 190D, and a multi-tenant database system 130 having a plurality of underlying hardware, software, and logic elements 120 therein that implement database functionality and a code execution environment within the host organization 110 and datacenter 180. The hardware, software, and logic elements 120 of the multi-tenant database system 130 are separate and distinct from a plurality of customer organizations (105A, 105B, and 105C) which utilize the services provided by the host organization's datacenter 180 by communicably interfacing to the host organization 110 via network 125.

In one embodiment, each of the separate and distinct customer organizations (105A-105C) may be remotely located from the host organization that provides services to the customer organizations (105A-105C) via datacenter 180 having the multi-tenant database system 130 executing therein. Alternatively, one or more of the customer organizations 105A-105C may be co-located with the host organization 110, such as within the same organization that hosts and provides the multi-tenant database system 130 upon which underlying data is persistently stored. Where the customer organizations 105A-C are remote, host organization 110 provides remotely implemented cloud computing services.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host organization 110. Host organization 110 may further receive API login requests 115 from one or more of the plurality of customer organizations 105A-105C via the network. For example, an incoming login request 115 may be a login request received at login domain 175 or may correspond to a request for services or a request to retrieve or store data on behalf of one of the customer organizations 105A-C.

In accordance with one embodiment, datacenter 180 receives a plurality of login requests 115 at a load balancer 195 of the datacenter, in which each of the plurality of login requests specify a user identifier (userID) and/or an organizational identifier (orgID). For example, each login request 115 may specify the userID and/or the OrgID from which the login request 115 originates, such as a userID and/or OrgID corresponding to one of customer organizations 105A-C or a user within one of the customer organizations 105A-C.

In such an embodiment, load balancer 195 then fans the plurality of login requests 115 across a plurality of redundant instances executing within the datacenter 180. For example, each of the plurality of login requests 115 may be randomly or systematically distributed (e.g., fanned, dispersed, etc.) amongst redundant instances executing within the depicted pods 190A-D. In such a way, each login request 115 is assigned to one of the plurality of redundant instances for authentication.

For each of the respective plurality of login requests 115 received and fanned/dispersed amongst the plurality of redundant instances, a lookup request is performed on the userID and/or the OrgID specified by the respective login request 115. For example, the lookup request is performed via an assigned redundant instance as a result of the load balancer 195 fanning the multiple received login requests 115; the assigned redundant instance being the redundant instance among the plurality of available redundant instance that receives or is "assigned" the login request from the load balancer 195 as a result of the fanning operation.

A lookup request performed within a given pod 190A-D by an assigned redundant instance may not necessarily locate the requested data. This may be a result of a bad request, a malformed request, an incorrectly specified userID and/or OrgID, a malicious/attack based login request, or a result of synchronization lag. Synchronization lag is possible where a datastore resource within one pod (e.g., 190A) has userIDs and/or OrgIDs that are not available in other pods (e.g., 190B-D), or where userIDs and/or OrgIDs are stored only at one datacenter and not at another datacenter. Synchronization lag may occur when a new user is introduced to the system and then a login request is submitted before data associated with the new user is distributed throughout the datacenters or throughout multiple datacenters within a host organization 110. Synchronization lag may also be deliberate, such as where data is stored at one datacenter and not another as a result of policy or stored within some pods and not others as a result of policy, designation, or system design.

Accordingly, when an initial lookup request fails within the assigned redundant instance, the assigned redundant instance proxies the lookup request to one or more recursive redundant instances. For example, if the lookup request fails within pod 1 at 190A, the lookup request may be proxied to pods 2 through N (e.g., 190B, 190C, and 190D) in search of the specified userIDs and/or OrgIDs. In such an embodiment, the lookup request is additionally proxied to a remote recursive redundant instance executing in a second datacenter, when the lookup request fails at the one or more recursive redundant instances within the first datacenter. For example, when all resources within the first datacenter are determined to have been exhausted, the assigned redundant instance may extend its search to a second datacenter which may have resources to locate the specified userIDs and/or OrgIDs.

Figure 2A:
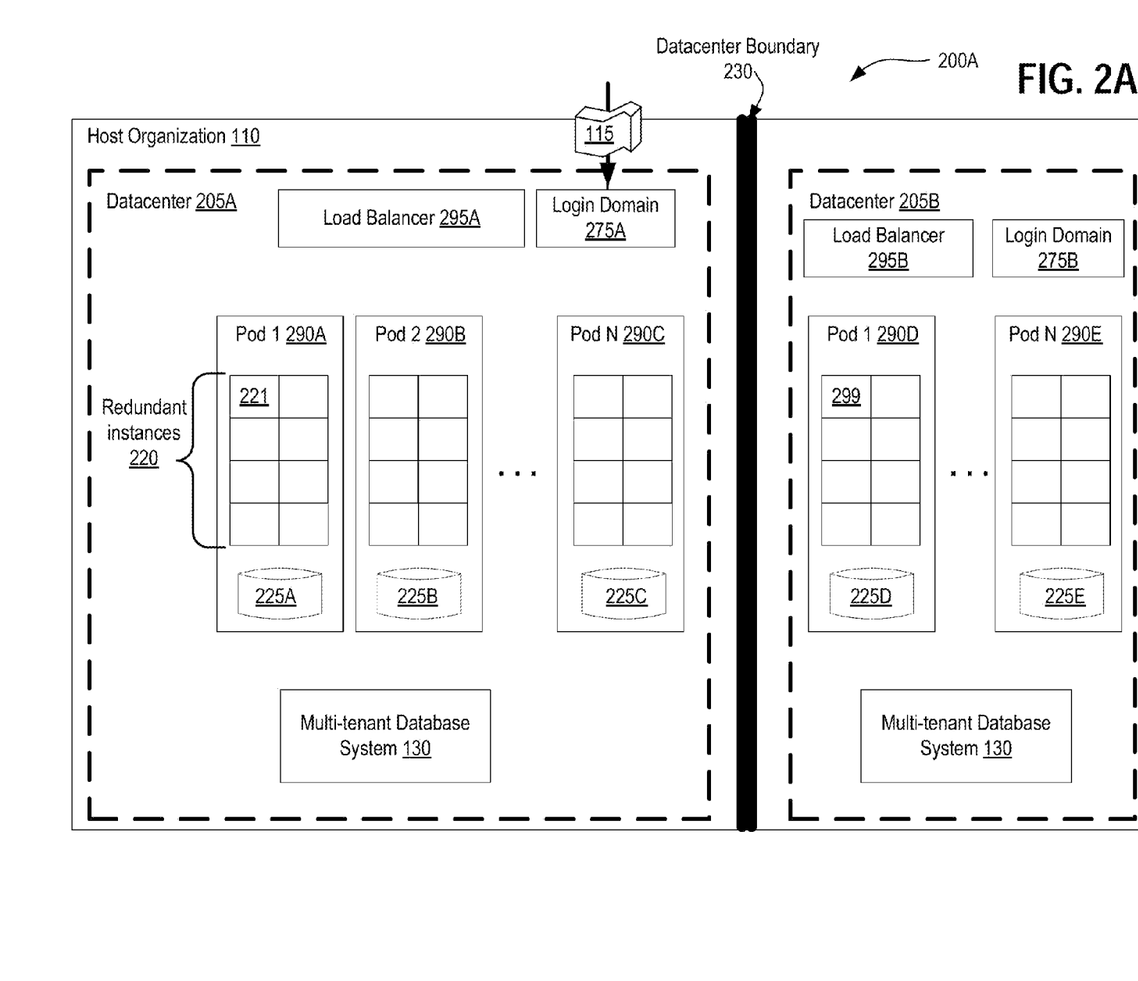
FIGS. 2A and 2B illustrate alternative exemplary architectures in which embodiments may operate.

FIG. 2A illustrates an alternative exemplary architecture 200A in which embodiments may operate. In particular, the computing architecture of host organization 110 is depicted in additional detail, including that of datacenters 205A and 205B. For example, within host organization 110, multiple datacenters 205A-B may be present, such as a datacenter in the Americas (e.g., 205A) and a second datacenter in Europe or Asia (e.g., 205B), or second, third, and additional datacenters distributed geographically based on the needs of the host organization 110. While multiple datacenters add well known advantages, they additionally introduce increased complexity and the potential for latency delays where transactions, such as authenticating a login request 115 cross a datacenter boundary 230, which may require information to be passed across great distances between geographically dispersed regions (e.g., such as between a datacenter 205A in the Americas and a datacenter 205B in Asia).

In one embodiment, an assigned redundant instance 221 executes within a first pod 290A having a first subset of the plurality of redundant instances 220 executing within the first datacenter 205A. For example, although pod 1 (290A) has 8× redundant instances 220 shown, 221 may act as an assigned redundant instance 221 for a particular login request assigned to it, dispersed to it, or delegated to it via a fanning algorithm performed by load balancer 295A.

In one embodiment, one or more recursive redundant instances 220 operate in a second one or more pods (e.g., pods 2 through N at elements 290B and 290C), where each of the second one or more pods 290B and 290C have a second one or more subsets of the plurality of the redundant instances 220 executing within the first datacenter 205A. Thus, in datacenter 205A, there are multiple pods 290A through 290C each having a subset of the multiple redundant instances 220 within the datacenter 205A.

Redundant instances may be, for example, Java Virtual Machines (JVMs) executing on hardware within the various pods 290A-C, individual computing nodes forming a grid or cluster of computing nodes within the pods 290A-C, computing blades within blade servers executing within the pods 290A-C, or other computing architecture capable of performing the various operations and methodologies described herein.

In one embodiment, the first pod 290A and each of the second one or more pods 290B-C each have a datastore (e.g., 225A, 225B, and 225C respectively) having a plurality of userIDs and/or OrgIDs stored therein. In such an embodiment, the datastore 225A-C of each pod 290A-C is accessible to the respective subset of redundant instances 220 operating within the same pod. In alternative embodiments, userIDs and/or OrgIDs may additionally or alternatively be stored within the multi-tenant database system 130 communicatively interfaced with the pods 290A-C. In yet another embodiment, userIDs and/or OrgIDs may additionally or alternatively be stored upon a global caching layer accessible via the various pods 290A-C.

In one embodiment, the assigned redundant instance 221 operates within the first pod 290A and a lookup request is determined to have failed at the assigned redundant instance 221 when the userID and/or the OrgID specified by the respective login request 115 cannot be located within the datastore 225A of the first pod 290A.

In one embodiment, each one or more recursive redundant instances 220 operates within one of the second one or more pods (290B though 290C) without overlap. For example, where an assigned redundant instance 221 determines that one or more recursive redundant instances 220 must be leveraged to perform recursive lookup requests, each of the one or more recursive redundant instances 220 are located within the remaining pods (e.g., not the pod to which the assigned redundant instance 221 belongs). In one embodiment only one recursive redundant instances 220 is referenced in each of the remaining pods 290B and 290C, and thus, there is no overlap between the one or more recursive redundant instances 220 referenced. For example, in one embodiment there is no overlap because each redundant instance 220 resides within only one pod 290A-C or is exclusive to one such pod.

In one embodiment, a lookup request is determined to have failed at the one or more recursive redundant instances 220 when the userID and/or the OrgID specified by the respective login request 115 cannot be located within the respective datastore (e.g., 225B and 225C) within any of the second one or more pods (e.g., 290B and 290C).

Where appropriate lookup requests within the first datacenter exhaust all possible resources (e.g., datastores 225A-C in accordance with one embodiment), a look up request is proxied to a second datacenter 205B. In one embodiment, datacenter 205B includes a load balancer 295B and a login domain 275B. In an alternative embodiment, datacenter 205B lacks a login domain 275B and all login requests 115 for the host organization 110 are received at login domain 275A of the first datacenter and then relayed to the second datacenter only when necessary. Datacenter 205B may additionally include a multi-tenant database system 130 which may be a replication of the multi-tenant database system 130 in datacenter 205A or may be a similar architecture but house data or persistently store data that is specific to datacenter 205B, such as data stored for customer organizations 105 that are associated with datacenter 205B for their storage needs and/or accounts. Datacenter 205B further includes its own pods (e.g., pod 1 at 290D and pod N at 290E) each of which have their own subset of redundant instances 220). Each pod 290D and 290E within datacenter 205B further includes a datastore (e.g., 225D and 225E respectively).

In one embodiment, proxying a lookup request to a remote recursive redundant instance 299 executing in the second datacenter 205B includes the assigned redundant instance 221 proxying the lookup request to the remote recursive redundant instance 299 upon a determination that all pods 290A-C located within the first datacenter 205A have been checked for the userID and/or the OrgID. In such an embodiment, the lookup request proxied to the remote recursive redundant instance 299 within the second datacenter 205B crosses the datacenter boundary 230.

Figure 2B:
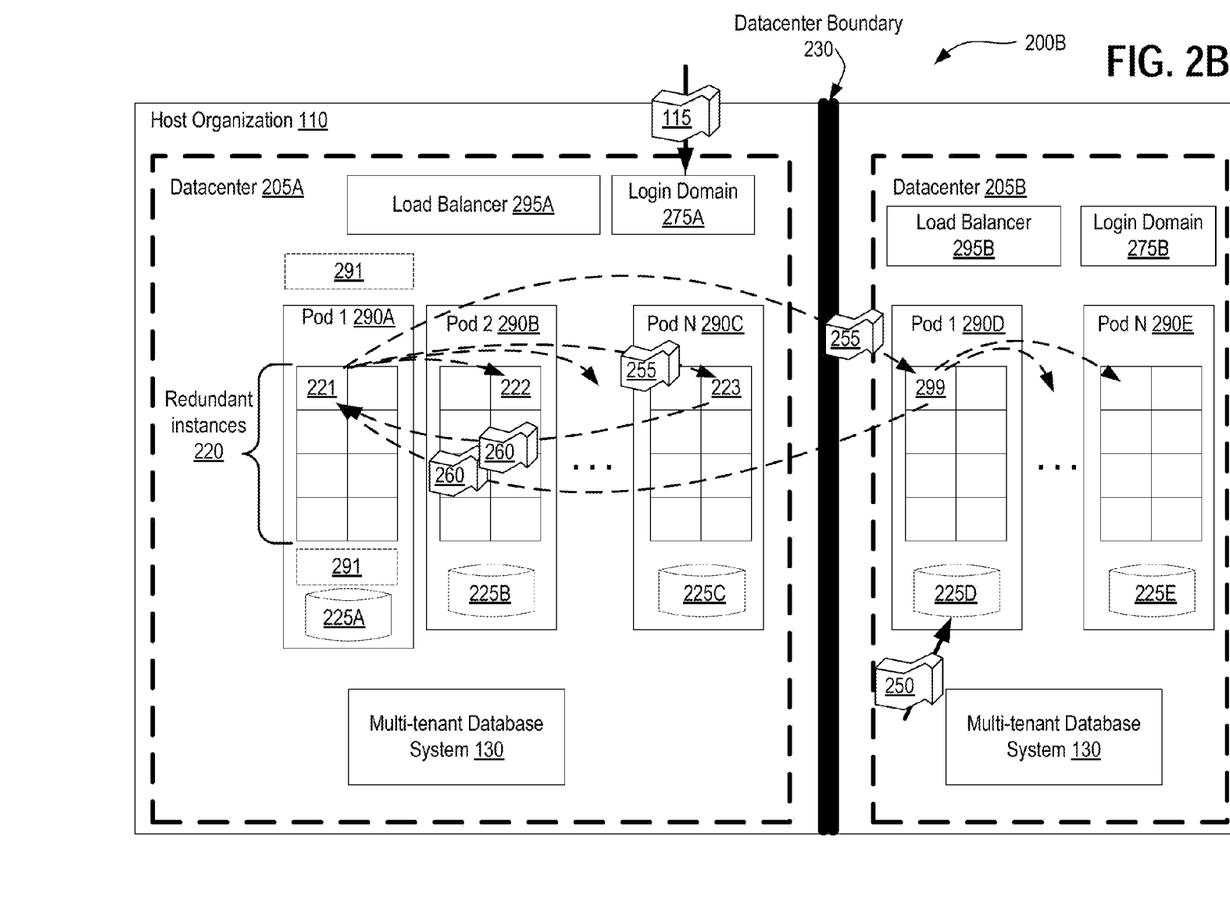

FIG. 2B illustrates an alternative exemplary architecture 200B in which embodiments may operate. In particular, various exemplary transactions are depicted in additional detail.

In accordance with one embodiment, a new userID and/or a new OrgID for a new account is entered into a datastore (e.g., 225D) within the second datacenter 205B. For example, new account data 250 is depicted as being entered into datastore 225D within datacenter 205B.

In such an embodiment, the new userID and/or the new OrgID associated with new account data 250 is not synchronized to one or more datastores (225A-C) within the first datacenter 205A when one of the plurality of login requests 115 is received at the first datacenter 205A specifying the new userID and/or the new OrgID associated with new account data 250. For example, the new userID and/or the new OrgID may be unavailable within the datastores 225A-C of the first datacenter 205A due to a synchronization lag between the datastore 225D within the second datacenter and the one or more datastores within the first datacenter 205A-C.

In such an embodiment, the assigned redundant instance 221 may proxy a lookup request 255 or send a proxied lookup request to a remote recursive redundant instance 299 executing in the second datacenter 205B in an effort to locate the new userID and/or the new OrgID associated with new account data 250. Accordingly, in such an embodiment, the assigned redundant instance 221 receives a response from the remote recursive redundant instance 299 within the second datacenter 205B indicating the login request specifying the new userID and/or the new OrgID has been authenticated. For example, FIG. 2B depicts the assigned redundant instance sending a proxied lookup request 255 to the remote recursive redundant instance 299 and then receiving an appropriate response 260 indicating successful authentication.

Similarly, where the assigned redundant instance 221 sends or proxies a lookup request 255 to a recursive redundant instance 223 within the same datacenter, an appropriate response 260 may be received from the recursive redundant instance 223 as depicted.

In one embodiment, a reference link is returned to the originator of the login request 115. For example, such a reference link may direct the originator of the login request 115 to direct subsequent requests for services to the one of the plurality of redundant instances having authenticated the corresponding login request 115. For example, the reference link may specify future requests for services (such as a database access to be transacted against the multi-tenant database system 130) to be directed to whichever of the various redundant instances 220 authenticated the login request 115. Thus, in accordance with the depiction set forth at FIG. 2, the reference link may point to assigned redundant instance 221, recursive redundant instance 223, or remote recursive redundant instance 299, depending on which eventually authenticates the login request 115.

In alternative embodiments, a returned reference link identifies a pod (e.g., one of 290A-E) that hosts the authenticating redundant instance 220 rather than a specific redundant instance. In other embodiments, subsequent requests for services are fed to the load balancer 295 which then fans or distributes the computational load required to process the service requests amongst the various redundant instances without regard to which redundant instance 220 or pod 290 authenticated a preceding login request 115.

In one embodiment, a lookup request is indicated to have failed at the assigned redundant instance 221 when the userID and/or the OrgID specified by the respective login request 115 cannot be located within a datastore accessible via the assigned redundant instance 221. For example, datastore 225A is accessible to assigned redundant instance 221, but the userID and/or the OrgID may not be present, thus triggering the failure.

In one embodiment, a lookup request is indicated to have failed at the one or more recursive redundant instances (e.g., 222 and 223) within the first datacenter 205A when the userID and/or the OrgID specified by the respective login request 115 cannot be located within any datastore (225B and 225C) accessible via the one or more recursive redundant instances 222 and 223 (e.g., the information is not accessible through any of the remaining pods' instances 220 or datastores 225B-C).

In one embodiment, a lookup request is indicated to have failed at the remote recursive redundant instance 299 when the userID and/or the OrgID specified by the respective login request 115 cannot be located within the datastore (225D) accessible via the remote recursive redundant instance 299. Alternatively, a lookup request is indicated to have failed at the remote redundant instance 299 when the userID and/or the OrgID specified by the respective login request 115 cannot be located within any datastore (225D-E) within the second datacenter 205B (e.g., where the remote redundant instance locally initiates its own recursive search through local pods 290D-E within its local datacenter 205B).

In one embodiment, a response 260 is returned to the assigned redundant instance 221 indicating the userID and/or the OrgID cannot be located. For example, response 260 may simply indicate a failed proxied lookup request. In one embodiment, the assigned redundant instance 221 receives multiple such responses 260, for example, one response 260 associated with each pod to which a proxied lookup request 255 was sent.

In one embodiment, each of the plurality of login requests 115 is an Application Programming Interface (API) login request received from one of: a separate and distinct remote organization, an organizational group within a host organization that operates the first and second datacenters 205A-B, a business partner, or a customer organization (e.g., 105A-C). In such an embodiment, each of the plurality of redundant instances 220 implements API login request functionality to validate and authenticate login credentials provided via the plurality of login requests 115 received.

API login request functionality may include support for an XML-RPC (eXtended Markup Language Remote Procedure Call) discovery call to resolve a username identifier and/or organizational identifier to a redundant instance 220 or a corresponding discovery call on behalf of another redundant instance, such as an assigned redundant instance 221.

API login request functionality may include support for forwarding the login request 115 "as is" and without modification (e.g., a byte for byte copy of the payload) including any post data received from the client in an un-altered form (e.g., "as is" or via "byte for byte" replication/forwarding).

For example, in one embodiment, proxying the lookup request to the one or more recursive redundant instances includes transmitting all post data associated with the API login request in an un-altered form to the one or more recursive redundant instances within the proxied lookup request. For instance, the post data may be replicated and injected into the proxied lookup request or encoded into the proxied lookup request when such a request is generated or created. In such an embodiment, transmitting all the post data in the un-altered form may include proxying the lookup request via a byte for byte replication/forwarding mechanism 291. A byte for byte replication/forwarding mechanism 291 depicted at FIG. 2B may reside within each of the various pods (e.g., within each of pods 290A through 290E), may be available as a common use module within each datacenter (e.g., each of 205A and 205B), or as a functional/logical unit locally available within each of the redundant instances 220.

Post data and payload data may include information provided by an end-user of a client device which is interfacing with the host organization. For example, such an end-user may enter information, such as login credentials (e.g., UserID, OrgID, password, etc.) or other necessary information into an interface at the client device which is then encoded into an API login request received by the host organization as payload data and/or post data. When proxying a request, such as a proxied login request or a proxied lookup request, a replication/forwarding mechanism may provide the byte for byte copying so that payload data and/or post data originating from a client device may be received by a targeted proxy location in an "as is" and un-altered form.

API login request functionality may include support for returning a response (e.g., 260) from an application server (e.g., from a redundant instance 220 or an associated pod 290) to be returned or directed to the client "as is" (e.g., as a byte for byte copy of the payload of response 260). For instance, in one embodiment, proxying the lookup request to the one or more recursive redundant instances further includes receiving, at the assigned redundant instance, a response from one of the one or more recursive redundant instances indicating a successful authentication responsive to the proxied lookup request. For instance, the assigned redundant instance may proxy out multiple lookup requests 255 to the various alternative pods (e.g., 290A-C) available within datacenter 205A, or proxy a lookup request to a pod (e.g., 290D-E) within a remote datacenter 205B. Notwithstanding the multiple lookup requests 255 sent/proxied, some of the proxied requests 255 may fail authentication due to an inability to locate the necessary data. Nevertheless, where at least one response (e.g., 260) indicates successful authentication, the others may be disregarded. When a successful authentication is indicated via at least one response 260 returned from either a recursive redundant instance (e.g., 222 or 223) or a remote recursive redundant instance (e.g., 299), the assigned redundant instance may transmit the response 260 indicating the successful result to a client device having originated the respective API login request and discard the responses 260 indicating failure. Moreover, transmitting the response from the receiving datacenter back to an end-user, client device, or other requesting entity may include sending the response via a byte for byte replication/forwarding mechanism 291 to such a client device, resulting in the originating client device receiving an identical byte for byte copy of a payload of the response 260 received at the assigned redundant instance indicating the successful authentication. Stated differently, a response sent to an originating client device may exhibit an identical structure and payload, regardless of whether authentication succeeds at an assigned redundant instance 221, or at any proxy location (e.g., at one of instances 222, 223, or 299).

API login request functionality may include support for an XML-RPC that is compatible with both old-soap variants (v2.0) and new soap variants (v2.5 and up); support for an XML-RPC and old soap WWW domain supported following non-login service requests as well (e.g., requested database transactions, a request to validate a login, a request for version information, a request for session information, or a request to authenticate an email or an email address).

Where an API login request lands at or is received at a World Wide Web (WWW) webserver, the login request may be forwarded to a load balancer directly or to a login domain 275A-B and then to a load balancer 295A-B. In other embodiments, the WWW webserver is eliminated from the login request path, and thus, a WWW load balancer or a login domain load balancer will receive the initial incoming API login request 115 without first having to traverse through or communicate with a WWW webserver.

API login request functionality may include support for a load balancer 295A-B to forward login requests using an API URL (e.g., API Uniform Resource Locator) configuration parameter stored in, for example, a serverpools.xml for a particular redundant instance 220. Such an API URL may be provided directly to an application server pool (e.g., a pod or group of pods) within the host organization 110 implementing the API login request functionality. API login requests may be handled directly by the application servers or redundant instances 220 having special purpose servlets, (e.g., LoginProxyServlets) capable of performing discovery (e.g., lookup requests and authentication) and proxy functions (e.g., proxying lookup requests or sending proxied lookup requests 255).

API login request functionality may include support for discovery logic in which requests are proxied to the appropriate destination after the discovery, thus eliminating thrashing or needless round-trips between data centers and may further include diverse implementation logic associated with distinct Enterprises, customer organizations, or business partners.

In one embodiment, load balancer 295 operates at or within a login domain 275 of the host organization 110. For example, load balancer 295A may operate at or within login domain 275A within the first datacenter 205A to receive the plurality of incoming login requests 115 from a plurality of customer organizations 105A-C of the host organization 110. Alternatively, load balancer 295 may operate separately from, but in conjunction with login domain 275.

In one embodiment, load balancer 295 receives a plurality of service requests from the plurality of customer organizations, where each service request specifies transactions to be executed against the multi-tenant database system(s) 130 operated by the host organization 110.

In some embodiments, flags may be utilized to track and control the API integrated login request 115 authentication processes. For example, in one embodiment the load balancer 295 injects a new request flag into each of the plurality of login requests 115 received. The new request flag may indicate an associated login request 115 is not yet assigned to one of the plurality of redundant instances 220. One of the plurality of redundant instances 220 may then become the assigned redundant instance 221 for any login request 115 assigned to it having the new request flag present. In such a way, when any one of the multiple executing redundant instances 220 available receives a login request 115, the redundant instance 220 can ascertain based on the new request flag that it is the first redundant instance to receive the login request 115 and thus, it is correspondingly the assigned redundant instance 221 for processing the login request 115.

In one embodiment, proxying a lookup request 255 to one or more recursive redundant instances (e.g., 222 and/or 223) when the lookup request fails at the assigned redundant instance 221 includes the assigned redundant instance 221 injecting a proxy flag into the proxied lookup request 255. Such a proxy flag may indicate to any of the one or more recursive redundant instances (222 and 223) or remote recursive redundant instance 299 that receiving the proxied lookup request 255 that the assigned redundant instance 221 is managing a recursive discovery algorithm within the first datacenter 205A to locate the userID and/or the OrgID specified by the respective login request 115. The proxy flag may further uniquely identify the assigned redundant instance 221 for the respective login request 115. The proxy flag may further direct any of the one or more recursive redundant instances (e.g., 222 or 223) receiving the proxied lookup request 255 not to initiate a recursive discovery algorithm within the first datacenter 205A given that the assigned redundant instance 221 is already doing so.

In one embodiment, when the userID and/or the OrgID specified by the respective login request 115 cannot be located within a datastore 225 accessible via the assigned redundant instance 221, the assigned instance initiates the recursive discovery algorithm. The recursive discovery algorithm may include: 1) exhausting, by executing in parallel, the proxied lookup request 255 against all datastores 225 within a plurality of pods 290A-C operating within the first datacenter 205A or all remaining pods 290B and 290C within the first datacenter 205A (e.g., all pods in a datacenter which are not associated with the assigned redundant instance 221). In one embodiment, the pods within the first datacenter have non-overlapping subsets of the plurality of redundant instances 220 allocated thereto and operating therein (e.g., each redundant instance 220 is associated with exactly one pod 290). The recursive discovery algorithm may further include 2) exhausting all datastores within a plurality of pods 225D and 225E operating within the second datacenter 205B by executing the proxied lookup request 255 against the second datacenter 205B; and 3) repeating the proxied lookup request 255 against any remaining one or more additional datacenters by executing the proxied lookup request 255 against each of the second datacenter 205B and the one or more additional datacenters in serial. In alternative embodiments, the proxied lookup request 255 is sent to all remaining datacenters (e.g., all datacenters within host organization 110 except for the first datacenter) in parallel.

In one embodiment, all invalid user names received are cached at the login domain 275 (e.g., at login.host_organization.com). For example, where all resources are exhausted at all datacenters 205 and a login request triggers a "bad username" or authentication failure message, the failed login credentials may be cached at the login domain 275 so that future login requests 115 having the same improper login credentials do not require a work flow that flows through the available pods 290 in multiple datacenters 205. Instead, a failure message may be returned based on the cache entry with minimal processing. In one embodiment, a reply to an invalid login request is delayed based on an average response time for all login requests 115 so as to reflect normal login response time and prevent rapid or quick succession logins such as those submitted via a systematic attack.

In one embodiment, proxying the lookup request 255 to the remote recursive redundant instance 299 executing in the second datacenter 205B includes injecting the proxy flag into the proxied lookup request 255, where the proxy flag indicates to the remote recursive redundant instance 299 receiving the proxied lookup request 255 that the assigned instance 221 is managing a recursive discovery algorithm from the first datacenter 205A and further directing the remote recursive redundant instance 299 to return a reference link to the assigned instance 221 specifying which of a plurality of remote redundant instances (e.g., 299 or any of redundant instances 220 within the pods 290D and 290E of the second datacenter 205B) has authenticated the corresponding login request 115.

In some embodiments, the assigned redundant instance 221 sends the proxied lookup request 255 to a second load balancer 295B operating within the second datacenter 205B. For example, rather than sending the proxied lookup request 255 directly to a redundant instance 220 within the second datacenter 205B (e.g., remote recursive redundant instance 299), the proxied lookup request 255 having the proxy flag injected therein is instead sent to load balancer 295B, where the second load balancer responsively fans the proxied lookup request 255 across the plurality of redundant instances 220 executing within the second datacenter 205B. The proxied lookup request 255 may be distributed/fanned along with a plurality of login requests 115 received at the second load balancer 295B of the second datacenter, including incoming login requests 115 that have not yet been processed at either datacenter 205A-B.

Whether the proxied lookup request 255 is sent to a redundant instance 220 of the second datacenter or to a load balancer of the second datacenter, a redundant instance of the second datacenter may be assigned to manage parallel execution of lookup requests and/or proxied lookup requests within the second datacenter. In such an embodiment, although a redundant instance 220 is assigned to perform such a function, because the proxy flag is present within the proxied lookup request 255, the assigned redundant instance within the second datacenter 205B (e.g., redundant instance 299 acting as a remote recursive redundant instance) may responsively return or send a response 260 from the second datacenter back to the assigned redundant instance 221 within the first datacenter indicating authentication of the corresponding login request 115 was successful and uniquely identifying one of the plurality of redundant instances 220 within the second datacenter that authenticated the login request (e.g., based on a received proxied lookup request 255). In one embodiment, a special header, such an "API LOGIN PROXY" header or an equivalent identification header, indicates that the login request is being proxied as a proxied lookup request 255 and thus performs the function of the proxy flag.

In one embodiment, multiple data elements are injected into a header of each of the plurality of login requests received by a load balancer 295. For example, load balancer 295 may inject a client Internet Protocol Identifier (clientIP) into each header to store a value corresponding to the actual IP address of an originating client having sent each respective login request 115. For example, the IP address of a client computing device within one of the customer organizations 105A-C may be injected. Load balancer 295 may inject a load balancer flag into each header indicating the load balancer has processed the respective incoming login request 115 (the load balancer flag injected into a header may function as a new request flag).

In one embodiment, each of the plurality of redundant instances processing an assigned/fanned login request 115 injects the proxy flag indicating the respective login request is being proxied across a datacenter boundary 230 geographically separating the first datacenter 205A from a separate and distinct second datacenter 205B when the userID and/or the orgID associated with the respective login request is not locatable within the first datacenter 205A.

When incoming API login requests flow through multiple external facing VIPs (Virtual Internet Protocol addresses), the value added by the first VIP (e.g., an actual ClientIP) may be lost within an un-altered header using ordinary packet routing. Support is therefore provided for the API login request to flow through multiple external facing VIPs (between multiple proxy hops) so that requests flowing through different load balancers do not cause the actual client IP address to be lost. For example, where a WWW domain to an application server/redundant instance hop is performed, requests proxied from a WWW domain level load balancer may go directly to an application server pool and not through a login sub-domain (e.g., 275) or corresponding load balancer 295. In one embodiment a new header entry is injected to a proxied lookup request or proxied login request to carry forward the actual client-IP address (e.g., a "LOGIN PROXY CLIENT IP" header entry, "ACTUAL CLIENT IP" header entry, or equivalent header identification). When such a client-IP address header is present and the routable IP address indicated by such a proxied request is pointing to an IP address within the host organization's 110 own data center implementing the API login request functionality, the remote address of the client (e.g., the client IP address) can nevertheless be derived from the client IP header, thus allowing the host organization to properly route any response to the requesting client using the client's actual/original IP address (e.g., which may otherwise be lost due to the proxying mechanism). Support may additionally be provided for forwarding a whitelisted set of headers.

In some embodiments, to distinguish service requests from login requests 115, the presence of a special HTTP header is checked. For example, checking for a "LOGIN LOAD BALANCER" header or equivalent entry in the HTTP header may indicate the presence of a login request 115 which requires the API integrated login authentication methodologies described herein (compared to service request which may request an ordinary database transaction). In one embodiment, load balancer 295 inserts the special header for all requests landing on a "login" sub-domain to distinguish such requests from incoming service requests. For example, all requests may be sent to a common or shared application server pool for processing via redundant instances 220, and thus, the header flags appropriately identify a request type.

In accordance certain embodiments, a fanning or an equivalent distribution algorithm references a leader identifier (leaderId) element indicating a leader pod 290 or a leader redundant instance 220 to be referenced first within a particular datacenter 205B. For example, the entity specified by such a leaderID will be tried first (e.g., will become an assigned instance 221 or will become the first referenced recursive redundant instance 222 and 223 within remaining pods in a datacenter or will become the first referenced remote recursive redundant instance 299 within a second datacenter 205), so as to optimize the proxied lookup requests 255.

In an alternative embodiment, a leaderId is not referenced so as to avoid checking all servers/redundant instances 220 in the same order, which may lead to a lack of distribution across the instances in particular data center implementations. For example, specified redundant instances corresponding to the leaderID may be over utilized. Other distribution schemes may force cross instance calls in which the cross instance calls have to obtain a lock amongst the redundant instances 220 (e.g., in a particular datacenter or among a subset of redundant instances in a particular pod) and in which the number of locks are limited so as to prevent/mitigate DOS (Denial Of Service) attacks. Although such a locking scheme forces contention in which both good (e.g., legitimate) users and bad (e.g., attacking) users contend for the limited pool of locks and connections, potential damage from attacks can be minimized.

In one embodiment, a login request is directed toward a specific instance (e.g., assigned instance 221) which is not load-balanced. Such login requests may be directed toward a "login" sub-domain by-passing server pool load-balancing or directed toward a particular instance or pod directly. In such an embodiment, SOAP/XML RPC/OldSoap protocol based servlets forward a proxied login request or a proxied lookup request 255 to corresponding proxy servlets after checking special headers such as the "LOGIN LOAD BALANCER" or "API LOGIN PROXY" type headers described above to determine if the login request being processed is a direct login request (e.g., a first instance) or a proxied/recursive login request or lookup request. For example, a first instance may have the "LOGIN LOAD BALANCER" inserted, but it would not have an "API LOGIN PROXY" header entry as the first instance request would not have undergone proxying to any redundant instance.

Discovery may be performed in which a lookup by username or organizational ID is performed directly from a users table or an organizations table, for example, a table listing all respective users and/or customer organizations known to the host organization. When a match is discovered (e.g., the lookup request or lookup operation is complete), the request may then be proxied to a specific end point directly where it is handled by, for example, a SOAP stack/XML RPC stack/Axis, etc. to perform and complete authentication. When a match is not discovered via an initial lookup request, the request is proxied in a loop to local redundant instances without fanning (e.g., with a special header "API LOGIN PROXY"), so that the proxy servlets handle the proxied request on behalf of another instance, such as assigned redundant instance 221). When a match is still not discovered via the proxied lookup request 255, the request is proxied in a loop to remote instances at remote datacenters. In a particular embodiment, the proxy loop to remote instances is limited to only one redundant instance maximum per remote/non-local data center (with a special header again, such as "API LOGIN PROXY") with a fanning request. The remote instance will then try all instances local to the remote instance when it sees the fanning request header.

Figure 3:
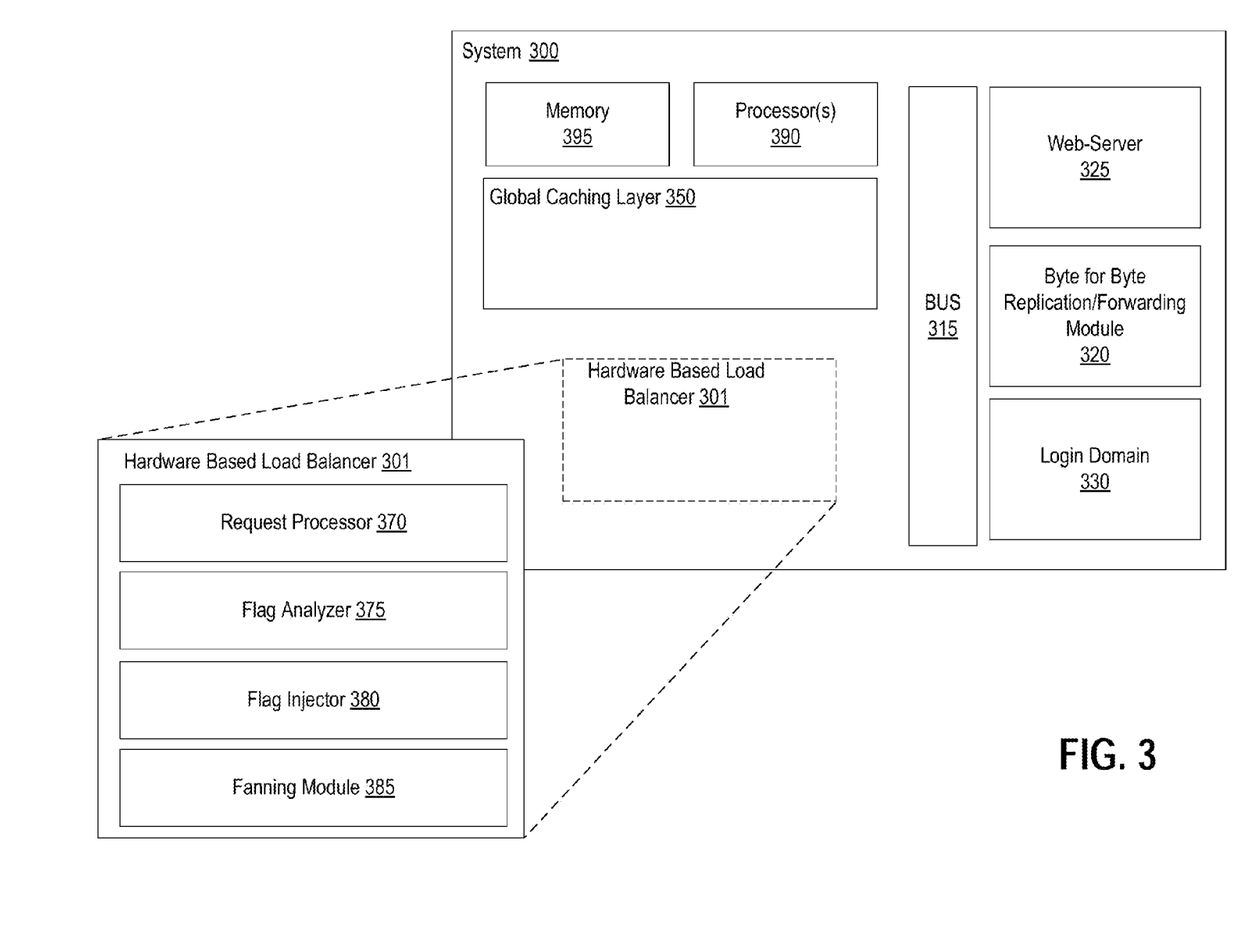
FIG. 3 shows a diagrammatic representation of a system in which embodiments may operate, be installed, integrated, or configured.

FIG. 3 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 such as login requests and API login requests among a plurality of redundant instances communicably interfaced with bus 315. System 300 further includes web-server 325, for example, to receive requests, return responses, and otherwise interface with remote clients, such as client devices located within customer organizations 105A-C and a byte for byte replication/forwarding module 320 to provide a true or exact copy of post data and/or payload data received at system 300 within an incoming request (e.g., such as within an API login request received via login domain 330).

System 300 further includes a global caching layer 350 to provide caching services to communicably interfaced devices and systems and in particular, provide caching of failed logins and other login request data shared amongst redundant instances or pods (e.g., meta data, etc.). System 300 is further depicted as having login domain 330 designed receive login requests either directly or as directed from another landing within system 300, such as from a WWW domain implemented by, for example, web-server 325. Login domain 330 may inject special flags or header entries into received login requests. Login domain 330 forwards login requests either directly to an assigned redundant instance or to an appropriate load balancer.

For example, distinct within system 300 is hardware based load balancer 301 which includes request processor 370, flag analyzer 375, flag injector 380, and fanning module 385. In accordance with one embodiment, request processor 370 receives login requests forwarded or passed from login domain 330 for distribution amongst available redundant instances for processing and authenticating the login requests. Request processor 370 further coordinates with flag analyzer 375 to check for and interpret any available flags within the login request. For example, the login request may be a proxied login request or a proxied lookup request to be processed on behalf of another redundant instance rather than a new login request. Request processor 370 further coordinates with flag injector 380 to introduce/inject flags and header entries into login requests so that they may be proxied and routed through the API integrated login authentication mechanism appropriately (e.g., a proxy flag may be introduced to indicate to a recursive redundant instance or a remote redundant recursive instance that the login request is a proxied login request or a proxied lookup request rather than a new login request not yet assigned to a redundant instance). Fanning module 385 implements fanning logic to distribute login requests and/or proxied login requests amongst available redundant instances for processing, including referencing and utilizing a leaderID when available.

Figure 4:
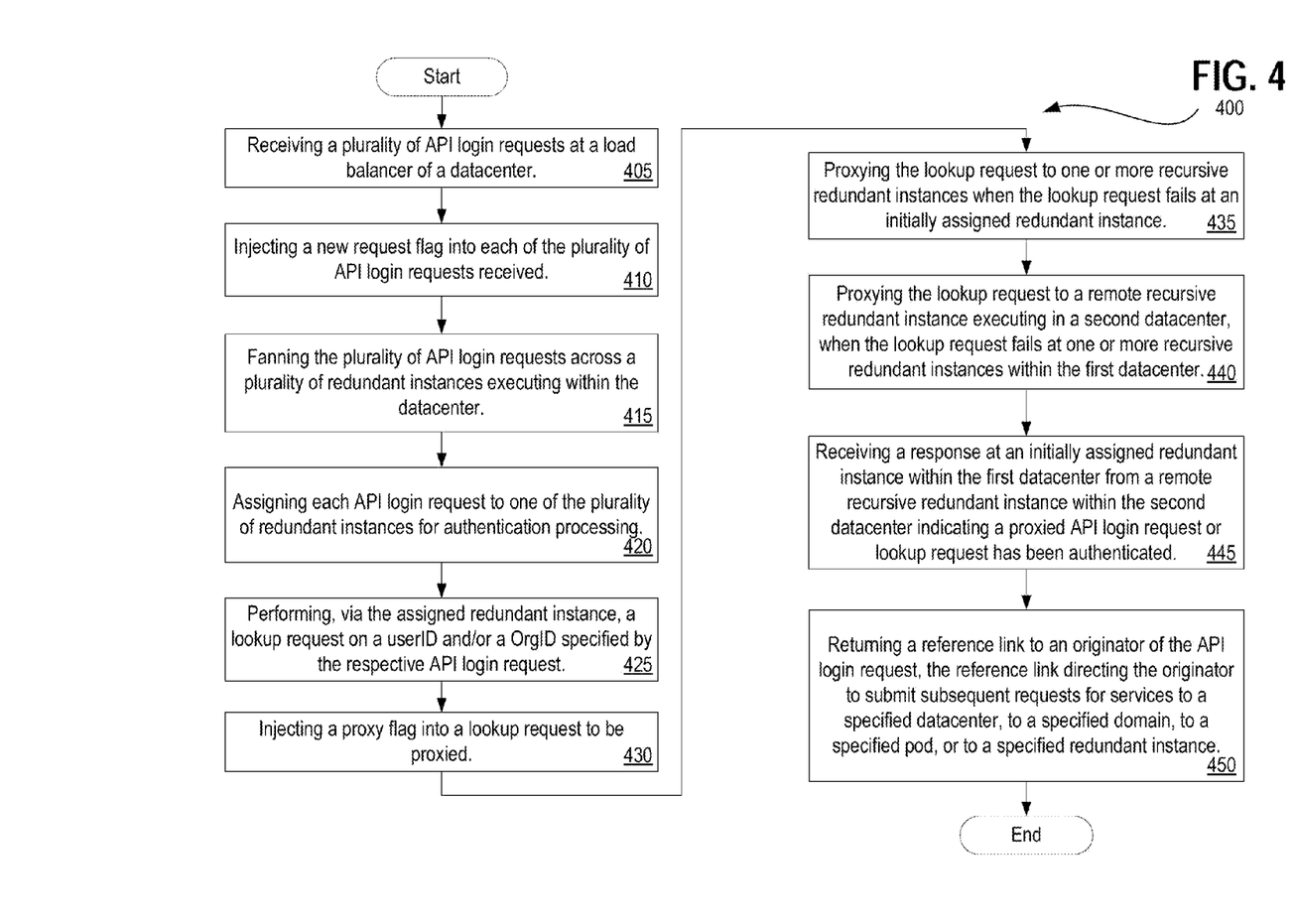
FIG. 4 is a flow diagram illustrating a method for efficient API integrated login in a multi-tenant database environment and for decreasing latency delays during an API login request authentication in accordance with one embodiment.

FIG. 4 is a flow diagram illustrating a method 400 for efficient API integrated login in a multi-tenant database environment and for decreasing latency delays during login request authentication in accordance with one embodiment, including fanning (e.g., distributing or load balancing), performing discovery and lookup, conducting authentication of login credentials, and responding to login requests (e.g., 115) in accordance with certain embodiments. Method 400 may be performed by processing logic that may include hardware (e.g., circuitry, dedicated logic, programmable logic, microcode, etc.), software (e.g., instructions run on a processing device to perform various operations such receiving, load-balancing, proxying, authenticating, responding, etc., or a combination thereof. In one embodiment, method 400 is performed by hardware logic, such as the hardware based load balancer depicted at element 301 of FIG. 3. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic receiving a plurality of login requests at a load balancer of a datacenter (block 405). At block 410, processing logic injects a new request flag into each of the plurality of login requests received.

At block 415, processing logic fans (e.g., distributes, load balances, etc.) the plurality of login requests across a plurality of redundant instances executing within the datacenter and at block 420, processing logic assigns each login request to one of the plurality of redundant instances for authentication processing.

At block 425, processing logic within an assigned redundant instance performs a lookup request on a userID and/or a OrgID specified by the respective login request. At block 430, processing logic injects a proxy flag into a lookup request to be proxied.

At block 435, processing logic proxies the lookup request to one or more recursive redundant instances when the lookup request fails at the initially assigned redundant instance. At block 440, processing logic proxies the lookup request to a remote recursive redundant instance executing in a second datacenter, when the lookup request fails at one or more recursive redundant instances within the first datacenter.

At block 445, processing logic receives a response at the initially assigned redundant instance within the first datacenter from a remote recursive redundant instance within the second datacenter indicating a proxied login request has been authenticated.

At block 450, processing logic returns a reference link to an originator of the login request, the reference link directing the originator to submit subsequent requests for services to a specified datacenter, to a specified domain, to a specified pod, or to a specified redundant instance.

Figure 5:
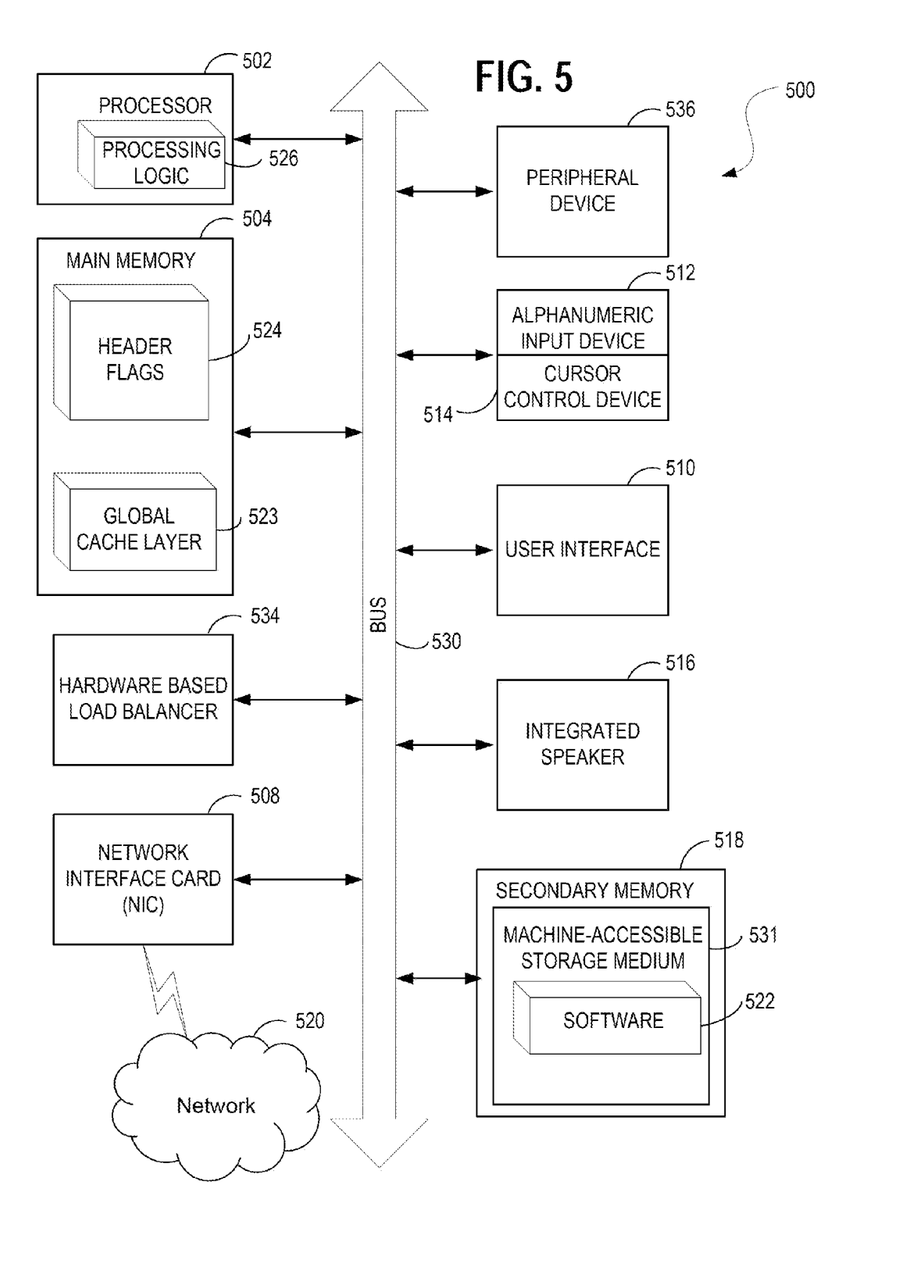
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes header flags 524 to indicate, for example, a request type (e.g., login request or services request), whether a login request is a new login request or a proxied login request/proxied lookup request, etc. Main memory 504 further includes global cache layer 523, such as a system-wide accessible global caching layer to provide meta-data and other information exchanged between multiple redundant instances and/or pods. Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based load balancer 534 to implement a fanning algorithm or other distribution scheme and to additionally evaluate and inject, where necessary, appropriate header flags and entries into login requests to be processed by computer system 500.

The secondary memory 518 may include a non-transitory machine-readable storage medium (or more specifically a non-transitory machine-accessible storage medium) 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a first datacenter, the method comprising:
   receiving a plurality of Application Programming Interface (API) login requests at a load balancer of the first datacenter, each of the plurality of API login requests specifying a user identifier (userID);
   fanning, via the load balancer, the plurality of API login requests across a plurality of redundant instances executing within the first datacenter, assigning each API login request to one of the plurality of redundant instances for authentication; and
   for each of the respective plurality of API login requests:
      (i) performing a lookup request on the userID specified by the respective API login request via the assigned redundant instance,
      (ii) proxying the lookup request to one or more recursive redundant instances when the lookup request fails at the assigned redundant instance, and
      (iii) proxying the lookup request to a remote recursive redundant instance executing in a second datacenter, when the lookup request fails at the one or more recursive redundant instances within the first datacenter; and
   wherein the method further comprises injecting into each header of the plurality of API login requests, a proxy flag indicating the respective login request is being proxied across a datacenter boundary geographically separating the first datacenter from the separate and distinct second datacenter when the userID associated with the respective API login request is not locatable within the first datacenter.

2. The method of claim 1, wherein proxying the lookup request to the one or more recursive redundant instances comprises transmitting all post data associated with the API login request in an un-altered form to the one or more recursive redundant instances within the proxied lookup request.

3. The method of claim 2, wherein transmitting all the post data in the un-altered form comprises proxying the lookup request via a byte for byte replication/forwarding mechanism.

4. The method of claim 3, wherein proxying the lookup request to the one or more recursive redundant instances further comprises:
   receiving, at the assigned redundant instance, a response from one of the one or more recursive redundant instances indicating a successful authentication responsive to the proxied lookup request; and
   transmitting the response to a client device having originated the respective API login request, wherein transmitting the response comprises sending the response via a byte for byte replication/forwarding mechanism to the client device, wherein the originating client device receives an identical byte for byte copy of a payload of the response received at the assigned redundant instance indicating the successful authentication.

5. The method of claim 1, wherein each of the plurality of API login requests are received from one of: a separate and distinct remote organization, an organizational group within a host organization that operates the first and second datacenters, a business partner of the host organization, or a customer organization that subscribes to cloud computing services provided by the host organization.

6. The method of claim 5, wherein each of the plurality of redundant instances implements API login request functionality to validate and authenticate login credentials provided via the plurality of API login requests received.

7. The method of claim 1, wherein the method further comprises:
   injecting, via the load balancer, a new request flag into each of the plurality of API login requests received, the new request flag indicating an associated API login request is not yet assigned to one of the plurality of redundant instances; and
   wherein the one of the plurality of redundant instances becomes the assigned redundant instance for any API login request received having the new request flag present.

8. The method of claim 7, wherein proxying the lookup request to the one or more recursive redundant instances when the lookup request fails at the assigned redundant instance comprises:
   injecting, via the assigned redundant instance, a proxy flag into the proxied lookup request, the proxy flag indicating to any of the one or more recursive redundant instances receiving the proxied lookup request that the assigned redundant instance is managing a recursive discovery algorithm within the first datacenter to locate the userID specified by the respective API login request, the proxy flag further uniquely identifying the assigned redundant instance for the respective API login request, and the proxy flag further directing any of the one or more recursive redundant instances receiving the proxied lookup request not to initiate a second recursive discovery algorithm within the first datacenter responsive to the proxied lookup request.

9. A method in a first datacenter, the method comprising:
   receiving a plurality of Application Programming Interface (API) login requests at a load balancer of the first datacenter, each of the plurality of API login requests specifying a user identifier (userID);
   fanning, via the load balancer, the plurality of API login requests across a plurality of redundant instances executing within the first datacenter, assigning each API login request to one of the plurality of redundant instances for authentication; and
   for each of the respective plurality of API login requests:
      (i) performing a lookup request on the userID specified by the respective API login request via the assigned redundant instance,
      (ii) proxying the lookup request to one or more recursive redundant instances when the lookup request fails at the assigned redundant instance, and
      (iii) proxying the lookup request to a remote recursive redundant instance executing in a second datacenter, when the lookup request fails at the one or more recursive redundant instances within the first datacenter; and
   wherein proxying the lookup request to the remote recursive redundant instance executing in the second datacenter comprises:
      (i) injecting a proxy flag into the proxied lookup request, the proxy flag indicating to the remote recursive redundant instance receiving the proxied lookup request that the assigned redundant instance is managing a recursive discovery algorithm from the first datacenter and further directing the remote recursive redundant instance to return a reference link to the assigned redundant instance specifying which of a plurality of redundant instances executing within the second datacenter authenticated the corresponding API login request;
      (ii) sending the proxied lookup request to a second load balancer operating within the second data center having the proxy flag injected therein, wherein the second load balancer fans the proxied lookup request across the plurality of redundant instances executing within the second datacenter along with a plurality of API login requests received at the second load balancer of the second datacenter; and
      (iii) receiving, from the second datacenter, a response indicating authentication of the corresponding API login request was successful and uniquely identifying one of the plurality of redundant instances within the second datacenter that authenticated the API login request based on the received proxied lookup request.

10. The method of claim 1, wherein the method further comprises:
   injecting, via the load balancer, a plurality of data elements into the header of each of the plurality of API login requests received, wherein injecting the plurality of data elements comprises:
   injecting a client Internet Protocol Identifier (clientIP) into each header to store a value corresponding to the actual IP address of an originating client having sent each respective API login request;
   injecting a load balancer flag into each header indicating the load balancer has processed the respective incoming API login request.

11. The method of claim 1:
   wherein the assigned redundant instance executes within a first pod having a first subset of the plurality of redundant instances executing within the first datacenter; and
   wherein each of the one or more recursive redundant instances operate in a second one or more pods, each of the second one or more pods having a second one or more subsets of the plurality of the redundant instances executing within the first datacenter.

12. The method of claim 11:
   wherein the first pod and each of the second one or more pods each comprise a datastore having a plurality of userIDs stored therein; and
   wherein the datastore of each pod is accessible to the respective subset of redundant instances operating within the same pod.

13. The method of claim 12:
   wherein the assigned redundant instance operates within the first pod; and
   wherein the lookup request fails at the assigned redundant instance when the userID specified by the respective API login request cannot be located within the datastore of the first pod.

14. The method of claim 13:
wherein each of the one or more recursive redundant instances operate within one of the second one or more pods without overlap; and
wherein the lookup request fails at the one or more recursive redundant instances when the userID specified by the respective API login request cannot be located within the respective datastore within any of the second one or more pods.

15. The method of claim 14, wherein proxying the lookup request to the remote recursive redundant instance executing in the second datacenter comprises the assigned redundant instance proxying the lookup request to the remote recursive redundant instance upon a determination that all pods located within the first datacenter have been checked for the userID.

16. A method in a first datacenter, the method comprising:
receiving a plurality of Application Programming Interface (API) login requests at a load balancer of the first datacenter, each of the plurality of API login requests specifying a user identifier (userID);
fanning, via the load balancer, the plurality of API login requests across a plurality of redundant instances executing within the first datacenter, assigning each API login request to one of the plurality of redundant instances for authentication; and
for each of the respective plurality of API login requests:
  (i) performing a lookup request on the userID specified by the respective API login request via the assigned redundant instance,
  (ii) proxying the lookup request to one or more recursive redundant instances when the lookup request fails at the assigned redundant instance, and
  (iii) proxying the lookup request to a remote recursive redundant instance executing in a second datacenter, when the lookup request fails at the one or more recursive redundant instances within the first datacenter;
entering a new userID for a new account into a datastore within the second datacenter; wherein the new userID is not synchronized to one or more datastores within the first datacenter when one of the plurality of API login requests are received at the first datacenter specifying the new userID due to a synchronization lag between the datastore within the second datacenter and the one or more datastores within the first datacenter;
receiving a response at the assigned redundant instance within the first datacenter after authentication is successful by the remote recursive redundant instance within the second datacenter, the response indicating the API login request specifying the new userID has been authenticated; and
returning a reference link to the originator of the API login request specifying the new userID, the reference link directing the originator to direct subsequent requests for services to the one of the plurality of redundant instances having authenticated the corresponding API login request.

17. The method of claim 1:
wherein the lookup request fails at the assigned redundant instance when the userID specified by the respective API login request cannot be located within a datastore accessible via the assigned redundant instance;
wherein the lookup request fails at the one or more recursive redundant instances when the userID specified by the respective API login request cannot be located within any datastore accessible via the one or more recursive redundant instances;
wherein the lookup request fails at the remote recursive redundant instance when the userID specified by the respective API login request cannot be located within any datastore accessible via the remote recursive redundant instance; and
wherein the method further comprises returning a response to the assigned redundant instance indicating the userID cannot be located.

18. The method of claim 1:
wherein the load balancer operates at a login domain of a host organization within the first datacenter to receive the plurality of incoming API login requests from a plurality of customer organizations of the host organization; and
wherein the load balancer further receives a plurality of service requests from the plurality of customer organizations, wherein each service request specifies transactions to be executed against a multi-tenant database system operated by the host organization, the multi-tenant database system comprising elements of hardware and software that are shared by a plurality of separate and distinct customer organizations, each of the separate and distinct customer organizations being remotely located from the host organization having the multi-tenant database system operating therein.

19. A method in a first datacenter, the method comprising:
receiving a plurality of Application Programming Interface (API) login requests at a load balancer of the first datacenter, each of the plurality of API login requests specifying a user identifier (userID);
fanning, via the load balancer, the plurality of API login requests across a plurality of redundant instances executing within the first datacenter, assigning each API login request to one of the plurality of redundant instances for authentication; and
for each of the respective plurality of API login requests:
  (i) performing a lookup request on the userID specified by the respective API login request via the assigned redundant instance,
  (ii) proxying the lookup request to one or more recursive redundant instances when the lookup request fails at the assigned redundant instance, and
  (iii) proxying the lookup request to a remote recursive redundant instance executing in a second datacenter, when the lookup request fails at the one or more recursive redundant instances within the first datacenter;
wherein when the userID specified by the respective API login request cannot be located within a datastore accessible via the assigned redundant instance, the assigned redundant instance initiates a recursive discovery algorithm comprising:
exhausting, by executing in parallel, the proxied lookup request against all datastores within a plurality of remaining pods operating within the first datacenter, the plurality of remaining pods within the first datacenter each having non-overlapping subsets of the plurality of redundant instances allocated thereto and operating therein;
exhausting, by executing the proxied lookup request against the second datacenter, all datastores within a plurality of pods operating within the second datacenter; and
repeating the proxied lookup request against any remaining one or more additional datacenters by executing the proxied lookup request against each of the second datacenter and the one or more additional datacenters in serial.

20. A non-transitory computer readable storage medium having instructions stored thereon that, when executed by a processor in a first datacenter, cause the first datacenter to perform a method comprising:

receiving a plurality of Application Programming Interface (API) login requests at a load balancer of the first datacenter, each of the plurality of API login requests specifying a user identifier (userID);

fanning the plurality of API login requests across a plurality of redundant instances executing within the first datacenter, assigning each API login request to one of the plurality of redundant instances for authentication; and for each of the respective plurality of API login requests:
   (i) performing a lookup request on the userID specified by the respective API login request via the assigned redundant instance,
   (ii) proxying the lookup request to one or more recursive redundant instances when the lookup request fails at the assigned redundant instance, and
   (iii) proxying the lookup request to a remote recursive redundant instance executing in a second datacenter, when the lookup request fails at the one or more recursive redundant instances within the first datacenter; and wherein the method further comprises injecting into each header of the plurality of API login requests, a proxy flag indicating the respective login request is being proxied across a datacenter boundary geographically separating the first datacenter from the separate and distinct second datacenter when the userID associated with the respective API login request is not locatable within the first datacenter.

21. A datacenter comprising:
a processor and a memory;
a login domain to receive a plurality of Application Programming Interface (API) login requests, each specifying a user identifier (userID);
a load balancer to implement a fanning algorithm to distribute the plurality of API login requests across a plurality of redundant instances within the datacenter, each API login request to be assigned to one of the plurality of redundant instances for authentication;
wherein for each of the respective plurality of API login requests:
   (i) an assigned redundant instance to execute via the processor and the memory, wherein the assigned redundant instance to perform a lookup request on the userID specified by the respective API login request;
   (ii) the assigned redundant instance to proxy the lookup request to one or more recursive redundant instances, each to execute via the processor and the memory, when the lookup request fails at the assigned redundant instance; and
   (iii) the assigned redundant instance to proxy the lookup request to a remote recursive redundant instance at a second datacenter, when the lookup request fails at the one or more recursive redundant instances within the datacenter; and
a flag injector to inject into each header of the plurality of API login requests, a proxy flag indicating the respective login request is being proxied across a datacenter boundary geographically separating the first datacenter from the separate and distinct second datacenter when the userID associated with the respective API login request is not locatable within the first datacenter.

22. The datacenter of claim 21, wherein a byte for byte replication and forwarding module of the datacenter generates and forwards the proxied lookup request to each of the one or more recursive redundant instances, the proxied lookup request having encoded therein all post data associated with the API login request in an un-altered form.

\* \* \* \* \*